United States Patent
Ghosh et al.

(10) Patent No.: US 10,051,569 B2
(45) Date of Patent: Aug. 14, 2018

(54) METHODS FOR ENTERPRISE BASED SOCIALLY AWARE ENERGY BUDGET MANAGEMENT AND DEVICES THEREOF

(71) Applicant: Infosys Limited, Bangalore (IN)

(72) Inventors: Animikh Ghosh, Kolkata (IN); Ketan Patil, Bangalore (IN)

(73) Assignee: Infosys Limited, Bangalore (IN)

(*) Notice: Subject to any disclaimer, the term of this patent is extended or adjusted under 35 U.S.C. 154(b) by 0 days.

(21) Appl. No.: 14/620,625

(22) Filed: Feb. 12, 2015

(65) Prior Publication Data

US 2015/0271751 A1  Sep. 24, 2015

(30) Foreign Application Priority Data

Mar. 20, 2014  (IN) .......................... 1483/CHE/2014

(51) Int. Cl.
| | |
|---|---|
| *G06F 1/26* | (2006.01) |
| *H04W 52/02* | (2009.01) |
| *H04W 84/20* | (2009.01) |
| *H04W 88/16* | (2009.01) |
| *G06F 1/32* | (2006.01) |

(52) U.S. Cl.
CPC ....... *H04W 52/0216* (2013.01); *H04W 84/20* (2013.01); *G06F 1/3203* (2013.01); *H04W 88/16* (2013.01); *Y02D 70/00* (2018.01); *Y02D 70/144* (2018.01); *Y02D 70/162* (2018.01); *Y02D 70/164* (2018.01)

(58) Field of Classification Search
CPC . G06F 1/3203; H04W 52/0216; H04W 84/20; H04W 88/16

USPC .......................................................... 713/322
See application file for complete search history.

(56) References Cited

U.S. PATENT DOCUMENTS

| | | | | |
|---|---|---|---|---|
| 8,594,854 | B1* | 11/2013 | Tareen | H04L 12/10 700/22 |
| 8,676,393 | B1* | 3/2014 | Hupton | H02J 3/14 307/24 |
| 9,298,513 | B2* | 3/2016 | Goodman | G06F 9/5061 |
| 2005/0121978 | A1* | 6/2005 | McAvoy | H02J 3/14 307/43 |

(Continued)

*Primary Examiner* — Jaweed A Abbaszadeh
*Assistant Examiner* — Volvick Derose
(74) *Attorney, Agent, or Firm* — LeClairRyan PLLC

(57) ABSTRACT

This technology provides a sustainable enterprise framework for associated gateways in a network to leverage group level decisions and redistribute allocated energy budget among the associated gateways. The enterprise framework is configured to allocate Gateway Hourly Budget (GHB) as hourly spending limit to the associated gateways, autonomously electing gateway leader from the associated gateways, predicting hourly energy requirement for the associated gateways, calculating energy difference parameter between the allocated GHB and predicted hourly energy requirement, transmitting the hourly energy difference parameter to the autonomously elected gateway leader. The leader further re-computes GHB for the associated gateways for the forthcoming hour and redistributes energy budget by ordering the one or more associated gateways to reset the hourly spending limit with the recomputed GHB, thereby enabling optimal utilization of energy and maximum runtime to the appliances connected to the network.

20 Claims, 2 Drawing Sheets

(56) References Cited

U.S. PATENT DOCUMENTS

| | | | |
|---|---|---|---|
| 2005/0232177 A1* | 10/2005 | Herrmann | H04W 52/327 370/315 |
| 2009/0228324 A1 | 9/2009 | Ambrosio et al. | |
| 2010/0110930 A1 | 5/2010 | Kohvakka et al. | |
| 2010/0171602 A1* | 7/2010 | Kabbara | G06F 1/266 340/333 |
| 2010/0211807 A1* | 8/2010 | Akimoto | G06F 1/305 713/310 |
| 2010/0292854 A1 | 11/2010 | Burg et al. | |
| 2011/0001358 A1 | 1/2011 | Conroy et al. | |
| 2011/0178652 A1* | 7/2011 | Carter | G06F 1/3203 700/296 |
| 2012/0011378 A1* | 1/2012 | Dalton | G06F 11/3062 713/300 |
| 2012/0101652 A1* | 4/2012 | Shin | H02J 3/14 700/296 |
| 2012/0109340 A1* | 5/2012 | Vezza | G01D 21/00 700/22 |
| 2012/0130924 A1* | 5/2012 | James | G01W 1/10 705/412 |
| 2012/0153725 A1* | 6/2012 | Grohman | H02J 3/14 307/39 |
| 2012/0185706 A1* | 7/2012 | Sistla | G06F 1/3206 713/300 |
| 2012/0209442 A1* | 8/2012 | Ree | H04L 12/2803 700/295 |
| 2013/0131883 A1* | 5/2013 | Yamada | H02J 3/14 700/295 |
| 2013/0151024 A1* | 6/2013 | Bae | H02J 3/14 700/295 |
| 2013/0278412 A1* | 10/2013 | Kelly | G08B 26/00 340/539.1 |
| 2014/0129521 A1* | 5/2014 | Marsden | H04W 4/02 707/623 |
| 2014/0250234 A1* | 9/2014 | Liesche | H04L 67/025 709/228 |
| 2014/0370928 A1* | 12/2014 | Ge | H04W 52/04 455/522 |
| 2015/0063473 A1* | 3/2015 | Nishibayashi | H04B 3/542 375/257 |
| 2015/0072702 A1* | 3/2015 | Chun | H04W 16/14 455/454 |
| 2015/0153714 A1* | 6/2015 | Ho | G06N 99/005 700/291 |
| 2015/0177814 A1* | 6/2015 | Bailey | B06F 1/3234 713/320 |
| 2016/0170469 A1* | 6/2016 | Sehgal | G06F 9/505 713/320 |
| 2016/0344234 A1* | 11/2016 | Hund | G06Q 10/0631 |

\* cited by examiner

METHODS FOR ENTERPRISE BASED SOCIALLY AWARE ENERGY BUDGET MANAGEMENT AND DEVICES THEREOF

This application claims the benefit of Indian Patent Application Serial No. 1483/CHE/2014 filed Mar. 20, 2014, which is hereby incorporated by reference in its entirety.

FIELD

The invention in general relates to sustainable initiative of an enterprise for managing energy redistribution among network appliances in a closed area network via a gateway. In particular, the invention relates to a sustainable enterprise based socially aware energy budget redistribution method, system and framework for one or more associated zigbee gateways.

BACKGROUND

Home and building automation is becoming even more popular with the support and use of personal area networks that allow local network enabled devices to wirelessly communicate with one another using low-power digital radios.

The Institute of Electronic and Electrical Engineers (IEEE) has ratified the IEEE 802.15.4 standard for mesh or personal area networks. ZigBee™ is one type of a standards certified suite of high level communication protocols using small, low-power digital radios based on the IEEE 802.15.4 standard. ZigBee™ specification is thus targeted for use with network enabled appliances and applications that require a low data rate, long battery life, as well as require secure networking. Some examples of such appliances and applications include: Home Entertainment and Control (e.g. Home automation, smart lighting, advanced temperature control, safety and security, movies and music); Wireless Sensor Networks; Industrial control; Embedded sensing; Medical data collection; Smoke and intruder warning; Building automation and the like. ZigBee™ has a defined rate of 250 kbit/s best suited for periodic or intermittent data or a single wireless signal transmission between network appliances and ZigBee™ enabled network gateways. Data transmission rates between ZigBee™ enabled network devices vary from 20 to 900 Kbps. Any ZigBee™ compatible network appliance can be tasked with running on the ZigBee™ network. Such ZigBee™ appliances are designed to have radios that operate on an established country specific frequency bands (i.e. 868 MHz in Europe, 915 MHz in USA/Australia, 2.4 GHz in most other countries) as well as 60 KB-256 KB integrated flash memory. However, the ZigBee™ suite was designed to have standardized application profiles that were specific to the type of market application in which the standard was to be used. For example, the ZigBee™ standard includes discreet application profiles for Home Automation; Smart Energy; Telecommunication Services; Health Care; RF4CE—Remote Control, etc. Each application profile has different set communication protocols within the PAN as well as gateways and servers, policy and decision making guidelines, memory usage, data rates and the like. Typically, ZigBee™ network appliances communicate with one or more servers over a wide area network (i.e. Internet), wherein one or more gateways sitting on the edge of a Personal Area Network (PAN) relay the communications between the network appliances and the servers. However, considering there can be several different close range ZigBee™ network appliances, many of which utilize different application profiles in a particular PAN, the sheer handling of data as well as load balancing and other optimization processes must be handled by the servers. Accordingly, the overall wide area network (between the PAN and the servers) can get bogged down with handling machine to machine communications, while also having to handle traditional network messaging. There exists lot of such ZigBee™ network with sensors/actuators in enterprise network nowadays. The gateway acts as local node aggregator which captures data from sensors/actuators and passes them to central server or accepts command from central server and passes them on to actuator to take any action. The U.S. patent application Ser. No. 14/186535 deals with a system and method for locally managing network devices utilizing low cost/lost power wireless machine to machine communication protocols. In general, the said patent application proposes a smart zigbee energy framework for a single gateway self-management.

However, the above prior art does not support energy management across one or more gateways enabling optimal utilization of energy and providing maximum runtime for all appliances connected to a network. For example, if suppose in an enterprise there are two gateways in a network and are allocated with some gateway energy budget for each gateway to run appliances connected to the gateways. Considering in one gateway due to gateway energy budget crisis it has to shut down an actuator associated with a printer, while the other gateway in the same enterprise network has budget allocation which is more than enough.

There has to be a framework, system and method for the gateways in an enterprise to communicate and redistribute energy among themselves and letting maximum runtime of appliances connected to the network and still pertaining to the total energy budget allocation by the enterprise.

Thus, there is a need for a framework, system and a method that can leverage one or more group level decisions and redistribute allocated energy budget by the enterprise among the one or more associated gateways, thereby enabling optimal utilization of energy and maximum runtime to the network appliances. That is, the framework, system and method should help the gateways to mutually work and be socially active to help each other if some of them is apprehending energy budget run out and enabling the socially aware gateways to interact among themselves and redistribute energy to support maximum run time of appliances connected to the enterprise network and still pertaining to the overall energy budget allocated by the enterprise to run all the appliances connected to the enterprise network.

SUMMARY

This technology provides a sustainable enterprise based framework for one or more associated gateways in a network to leverage one or more group level decisions and redistribute allocated energy budget by the enterprise among the one or more associated gateways. In accordance with an embodiment, the framework includes one or more sensors and actuators configured to communicate sensor data and actuator data from network appliance to the associated gateways, a server and an autonomously elected gateway leader among the one or more associated gateways. The server is configured to control demand response load and hourly energy spending limit in the one or more associated gateways by allocating Gateway Hourly Budget (GHB) to the one or more associated gateways. The one or more associated gateways are further configured to predict hourly energy requirement for the forthcoming hour, calculates the difference in energy budget by measuring the difference between GHB and the hourly energy requirement and transmits the difference in energy budget parameter to the autonomously elected gateway leader. The autonomously elected gateway leader on receiving the energy difference parameter for every hour from the one or more associated gateways, communicates and leverages the one or more group level decisions by re-computing GHB for the one or more associated gateways for the forthcoming hour, redistributing energy budget by ordering the one or more associated gateways to reset the hourly spending limit with the recomputed GHB and updating the server with the recomputed GHB for the one or more associated gateways. The one or more associated gateways on receiving the order to reset the hourly spending limit with the recomputed GHB from the autonomously elected gateway, the one or more associated gateways updates the hourly spending limit with the recomputed GHB respectively. The redistribution of energy budget for every hour among the one or more associated gateways provides optimal utilization of energy and maximum runtime to the appliances connected to the network.

This technology provides a sustainable enterprise based system for one or more associated gateways in a network to leverage one or more group level decisions and redistribute allocated energy budget by the enterprise among the one or more associated gateways. In accordance with an embodiment, the framework includes one or more sensors and actuators configured to communicate sensor data and actuator data from network appliance to the associated gateways, a server and an autonomously elected gateway leader among the one or more associated gateways. The server is configured to control demand response load and hourly energy spending limit in the one or more associated gateways by allocating Gateway Hourly Budget (GHB) to the one or more associated gateways. The one or more associated gateways are further configured to predict hourly energy requirement for the forthcoming hour, calculates the difference in energy budget by measuring the difference between GHB and the hourly energy requirement and transmits the difference in energy budget parameter to the autonomously elected gateway leader. The autonomously elected gateway leader on receiving the energy difference parameter for every hour from the one or more associated gateways, communicates and leverages the one or more group level decisions by re-computing GHB for the one or more associated gateways for the forthcoming hour, redistributing energy budget by ordering the one or more associated gateways to reset the hourly spending limit with the recomputed GHB and updating the server with the recomputed GHB for the one or more associated gateways. The one or more associated gateways on receiving the order to reset the hourly spending limit with the recomputed GHB from the autonomously elected gateway, the one or more associated gateways updates the hourly spending limit with the recomputed GHB respectively. The redistribution of energy budget for every hour among the one or more associated gateways provides optimal utilization of energy and maximum runtime to the appliances connected to the network.

This technology further provides a sustainability initiative method for an enterprise based socially aware energy budget redistribution among one or more associated gateways. The method includes allocating Gateway Hourly Budget (GHB) as hourly spending limit to the one or more associated gateways, autonomously electing gateway leader from the one or more associated gateways, predicting hourly energy requirement for forthcoming hour by the one or more associated gateways, calculating energy difference parameter between the allocated GHB and predicted hourly energy requirement by the one or more associated gateways, transmitting the energy difference parameter for every hour to the autonomously elected gateway leader by the one or more associated gateways, re-computing GHB for the one or more associated gateways for the forthcoming hour by the autonomously elected gateway leader, redistributing energy budget by ordering the one or more associated gateways to reset the hourly spending limit with the recomputed GHB and resetting the hourly spending limit with the recomputed GHB.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out this technology, which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
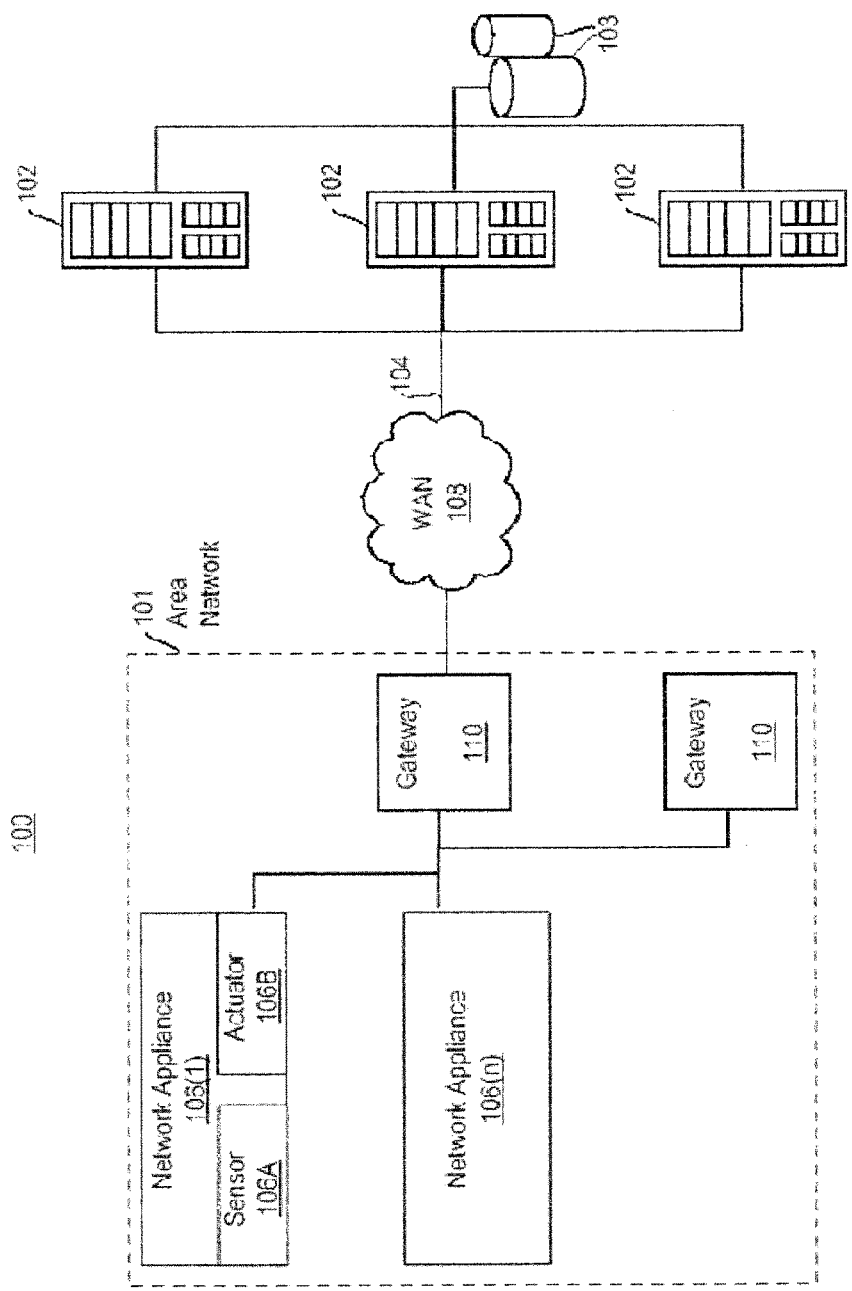
FIG. 1 illustrates a block diagram of an example system environment 100 that utilizes one or more network gateways 110 in accordance with an aspect of the present disclosure.

FIG. 1 illustrates a diagram of an example network environment that utilizes one or more network gateways implemented for use with a closed area network in accordance with an aspect of the present disclosure. In particular, the environment 100 includes one or more servers 102, a closed area network (CAN) 101 including one or more network enabled appliances ("network appliance") 106(1)-106(n) along with one or more network enabled gateways 110 in communication with the network appliances 106 and the servers 102.

It should be noted that although three servers 102, two network appliances 106(1)-106(n) and two gateways 110 are shown in FIG. 1, any number (including only one) of these network devices can be used without being limiting to the present disclosure. It should also be noted, in terms of the present disclosure, that the naming of any network device, software or hardware component or other element in singular form (e.g. 'gateway,' 'processor,' 'memory') does not limit it to the singular case and thus can be construed to be in the plural.

In an aspect, the servers 102 are connected to a local area network (LAN) 104 that is connected to a wide area network 108. In another aspect, the servers 102 are directly connected to the wide area network 108 for direct connection to one or more of the gateways 110 or for cloud based communications with the gateways 110. The servers 102 comprise one or more network devices or machines capable of operating one or more Web-based and/or non-Web-based applications that may be accessed by other network devices (e.g. gateways, network appliances, other servers) in the network 100.

In an aspect, one or more servers 102 runs software to allow control, operation and handling of any network appliance 106 (or sub-component thereof), any gateway 110 and/or any other network device in the closed area network 101 utilizing the ZigBee™ standard or the like.

In an aspect, one or more servers 102 may be front end Web servers, application servers, and/or database servers which may handle Web page(s), image(s) of physical objects, user account information, and/or other tasks or resources. One or more servers 102 may comprise a cluster of a plurality of servers which are managed by a network traffic management device (e.g. firewall, load balancer, web accelerator), gateway 110, router, hub and the like. In another aspect, the servers 102 implement a version of Microsoft® IIS servers, RADIUS servers and/or Apache® servers, and the like.

In an aspect, one or more servers 102 runs software to allow control of demand response load for one or more associated gateway 110 in a closed area network 101. Further, the one or more servers 102 estimates the overall energy budget for the network appliances 106(1)-106(n) for every hour in the closed area network 101 and allocates Gateway Hourly Budget (GHB) to the one or more associated gateways 110, such that the sum of the one or more associated gateways 110 Gateway Hourly Budget (GHB) is equal to the estimated overall energy budget for the network appliances 106(1)-106(n) in the closed area network 101.

The closed area network (CAN) 101 is described herein as a local area network (LAN) or personal area network (PAN) for an enterprise in which one or more low cost/low power network appliances are able to wirelessly communicate in the CAN 101 in accordance with an aspect of the present disclosure. As shown in FIG. 1A, the CAN 101 includes one or more network appliances 106(1)-106(n) which wirelessly communicate with one or more gateways 110 (and the managing module 200) via the ZigBee™ standard. It should be noted that although the ZigBee™ suite and associated IEEE 802.15.4 standard are disclosed for use with the managing module 200 of the present disclosure, other low cost/low power closed area networks utilizing the same or other wireless communication standard can be utilized with the managing module.

Network appliances 106(1)-106(n) comprise network enabled devices capable of connecting to and communicating with other network appliances as well as gateway(s) 110 and servers 102. As shown in FIG. 1A, one or more network appliance 106 includes at least one sensor 106A and at least one actuator 106B. However, it should be noted that the network appliance 106 may include only sensor(s) or only actuator(s).

In an aspect, the network appliance 106 can be one or more sensors 106A and/or one or more actuators 106B, wherein the primary function of the appliance 106, itself, is for sensing (e.g. motion detector) and/or actuation (e.g. door lock).

In another aspect, the network appliance 106 may be a combination of the sensor(s) 106A and/or actuator(s) 106B and a primary electronic device which performs a primary function other than sensing and/or actuation. The sensor(s) 106A and/or actuator(s) 106B may be external to the primary electronic device or are alternatively embedded in or integral with the primary electronic device. Non-limiting and non-exhausting examples of such primary electronic devices that may have sensor(s) 106A and/or actuator(s) 106B include, but are not limited to, lighting systems, HVAC systems, telecommunication devices, computer systems, computer peripheral systems, kiosks, GPS systems, switches, cameras, security systems and associated components, kitchen appliances, bathroom appliances, bedroom appliances, living room appliances, laundry facilities, water/ gas heaters, audio and/or video systems, video game systems, local network routers, power outlets, power utility meters, gas and water regulators, vehicles and vehicle components, industrial machinery and any other electronic device that can be operated remotely in residential, commercial or industrial settings.

In an aspect, the sensor 106A provides measurement or monitoring data to the gateway 110 in accordance with its associated application profile. Some example of sensors 106A include, but are not limited to, motion detectors, accelerometers, infrared sensors, temperature sensors, pressure sensors, radiation sensors, natural gas sensors, smoke detectors, carbon monoxide sensors, door sensors, window sensors, and the like.

Additionally, the actuator 106B receives commands or instructions from the gateway 110, wherein the actuator 106B performs the action in conformance with the received command/instruction. Some examples of actuators 106B include, but are not limited to, switches, locks, temperature valves, water valves, curtains, gas and water valves, utility meters, relays, motion sensors, alarms, temperature sensors, thermostats, VOC sensors and switches or any other hardware or software component which causes a device to perform a certain action. For example, sensor 106A may provide monitoring data to the gateway 110 that a person has entered a specific room, wherein the gateway 110 will instruct actuator 106B to turn on a light in that room.

Network 108 comprises a network accessible by an enterprise, such as the enterprise network, which handles communication between the network appliances 106(1)-106(n) and the servers 102, via the gateway(s) 110. However, it is contemplated that the network 108 may comprise other types of private and public networks. Communications between the gateway 110 and the servers 102 take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies. LAN 104 may comprise one or more private and public networks which provide secured access to the servers 102. It should be noted that the LAN 104 is not necessary to the operation of the system described herein.

Further, Gateway(s) 110 has the following behavioral aspects: Gateways 110 can communicate to one or more sensors and one or more actuators wirelessly; Gateways 110 can communicate to one or more peer gateways on the enterprise CAN 101; and the gateways 110 underlying operating system supports custom application loading and installation on the gateway 110.

In an aspect, a gateway leader is autonomously elected from the gateways 110 by applying the autonomous leader election algorithmic method on the broadcast enterprise CAN 101, so as to leverage one or more group level decision among the associated gateways 110 in the enterprise CAN 101.

In an exemplary embodiment, the autonomous leader election algorithmic method in an enterprise CAN 101 comprises the following steps:

At step 1, when the gateway 110 is up, it broadcasts <HELLO> packet on the enterprise CAN 101. If it receives any coordinator acknowledgement packet as <HELLO_FROM_COORDINATOR>, it knows that there exists a gateway leader in the enterprise CAN 101. Further in the received coordinator acknowledgement, the gateway leader assigns a network to the receiver gateway.

At step 2, if the gateway 110 doesn't receives any coordinator acknowledgement packet as <HELLO_FROM_COORDINATOR> for a fixed timeout period, then the gateway 110 declares itself as the gateway leader and starts listening from the peer gateway(s).

At step 3, when all the gateways 110 join together and to avoid multiple gateways 110 declare themselves as gateway leader, it is necessary during the first deployment to implement <RADIO_SLEEP> in each gateway for a random time period, such that the gateway will be active post <RADIO_SLEEP> time period and enables each gateway to rise and become active at different time period. This enables every gateway in the enterprise CAN 101 to rise at different times and this radio operational arbitration further enables to easily elect the gateway leader through the step 1 and step 2 of autonomous leader election algorithmic method. That is, the first gateway to wake up and start sending <HELLO> packet generally wouldn't receive any <HELLO_FROM_COORIDATOR> acknowledgement, and hence will declare itself as the gateway leader.

The autonomous leader election algorithmic method of electing the gateway leader works well for devices which are on a LAN as it is assumed that there are no significant packet losses. There are other standard gateway leader election algorithmic methods available for wireless sensors. This technology is not intended to be limited to the embodiment as revealed but is to be accorded the widest scope consistent with the principles and features described herein.

Once the gateway leader is elected, each gateway 110, predicts hourly energy requirement by the gateway for running the associated one or more network appliances for the forthcoming hour based on dynamic constraints, calculates energy difference parameter between the allocated GHB and predicted hourly energy requirement and transmits the energy difference parameter for every hour to the autonomously elected gateway leader.

In an exemplary embodiment, the dynamic constraints on the gateway 110 include:

Hourly budget requirement for gateway G(i) for the hour T(m) say Gateway Hourly Budget, GHB[G(i), T(m)], wherein G(i) belongs to gateway set and T(m) belongs to 1 to 24 hours of a day; and Policy defined by admin on each gateway specific to a sensor or actuator to keep the associated network appliance on or to shut down. The policy can be time based or usage based, wherein the usage represents level of consumption of allocated energy to run the network appliance. If no policy is defined, by default the gateway will try to keep the sensor/actuator running so as to support business continuity. Policy on a sensor/actuator is defined by P_dG(i)(k) which holds a value of either 1 or 0.

Further, hourly energy requirement prediction by the gateway for running the associated one or more network appliances for the forthcoming hour based on said above dynamic constraints can be derived by linear regression algorithmic method. The linear regression algorithmic method assumes the gateway input as standard average hourly consumption of one or more network appliances associated to the gateway and its respective maximum power consumption or wattage rating. The linear regression algorithmic method comprises the following steps to derive at the hourly energy requirement prediction by the gateway for the forthcoming hour:

At step 1, average energy requirement from input statistical data for devices which has no policy for keeping the network appliances shut down during the particular hour, say, AvgER[G(i),T(m)], and maximum projected energy necessity as MaxER[G(i),T(m)], wherein G(i) belongs to gateway set and T(m) belongs to 1 to 24 hours of a day and MaxER[G(i),T(m)] can be computed from the respective maximum power consumption or wattage rating.

At step 2, if the gateway is running for the first hour, that is, if it has no historical usage behavior, then it reports to the gateway leader that it is projecting extra energy if MaxER[G(i),T(m)] is less than GHB[G(i), T(m)] or a shortage of energy if MaxER[G(i),T(m)] is greater than GHB[G(i), T(m)]. In fact the gateway operates safe as it quotes maximum energy required and not average hourly requirement.

At step 3, from the third hour onward, the gateways perform smarter, by using last two hours usage pattern, say last hour usage pattern LHU[G(i)] and second last hour usage pattern SLHU[G(i)] to estimate the forthcoming hourly energy requirement for the gateway. They compute both AvgER[G(i),T(m)] and MaxER[G(i),T(m)] and predict the forthcoming hourly energy requirement to the gateway leader.

At step 4, using the above data a standard linear regression model can be designed to find the target prediction quote as a linear approximated function of the variables LHU[G(i)], SLHU[G(i)], AvgER[G(i),T(m)] and MaxER[G(i),T(m)]. The predicted quote PQ[G(i),T(m)] can be modelled as:

$$PQ[G(i),T(m)]=\beta 1. \ LHU[G(i)]+\beta 2. \ SLHU[G(i)]+ \beta 3. \ AvgER[G(i),T(m)]+\beta 4. \ MaxER[G(i),T(m)]$$

Where, $\Sigma \beta i=1$.

The weights of $\beta$ can be chosen based on various factors such as, a. sensor/actuator usage pattern in the second last and last hour; Number of devices operating and number of devices shut down; and if the hour of the day for the second last, last or coming up hour is peak hour or mid night. If weight of $\beta 4$ is at least 0.5, that is maximum projected energy is approximately twice the average energy requirement, then based on the above standard linear regression model the projected quote PQ[G(i),T(m)] value will be between AvgER[G(i),T(m)] and MaxER[G(i),T(m)].

At step 5, the gateway reports to the leader gateway, that it has a shortfall if, PQ[G(i),T(m)] is greater than GHB[G(i), T(m)] or reports that it has an excess of energy budget if PQ[G(i),T(m)] is less than GHB[G(i), T(m)]. The predicted shortage of energy budget or excess of energy budget can be calculated as below:

Predicted shortage of energy budget of gateway G(i) for time hour T(m), $$S[G(i),T(m)]=PQ[G(i),T(m)]-GHB[G(i),T(m)]$$

Predicted excess of energy budget of gateway G(i) for time hour T(m), $$E[G(i),T(m)]=GHB[G(i),T(m)]-PQ[G(i),T(m)]$$

Once the predicted shortage of energy budget or excess of energy budget is calculated by individual gateways for the forthcoming hour, they report the calculated energy budget to the leader gateway. The leader gateway then re-computes energy budget distribution GHB for the forthcoming hour for the associated gateways 110 in the enterprise CAN network 101. The re-computation of energy budget comprises the following steps:

At step 1, the gateway leader computes a sum total of excess energy for the forthcoming hour reported by the gateways as mentioned below:

$$E[T(m)]=\Sigma E[G(i)T(m)], \text{ where } i=1 \ldots \text{ no of gateways}$$

At step 2, the gateway leader computes a sum total of shortage of energy for the forthcoming hour reported by the gateways as mentioned below:

$$S[T(m)]=\Sigma S[G(i)T(m)], \text{ where } i=1 \ldots \text{ no of gateways}$$

At step 3, if E[T(m)] is greater than S[T(m)], then shortage in energy budget can be met by the excess energy budget. The gateway leader orders all the gateways which reported excess energy budget to set new hourly energy budget GHB baseline to:

$$PQ[G(i),T(m)]+((E[T(m)]-S[T(m)])/\text{Number of gateways})$$

if E[T(m)] is less than S[T(m)], then excess in energy budget cannot be met by the shortage. Hence the gateway leader now has to smartly distribute energy to gateways who reported shortage. First, the gateway leader orders the gateways who reported excess to set their baseline to PQ[G(i), T(m)]. Second, the gateway leader tries to find out among shortage reports which gateway requires energy budget badly, wherein badly means if the gateway falling short to run sensors/actuators normally or is it because of enforced ON policy. Third, the gateway leader collects energy budget required just to run policy enforced ON appliances. Fourth, the gateway leader allocates energy to gateways that are failing to run policy enforced ON actuators. Once such allocation is done, the gateway leader re-computes shortage for these shortage gateways and starts algorithmic computation to distribute the remaining excess energy budget among these shortage gateways. This can be accomplished in three schemes, namely priority based scheme, serve starving gateway first scheme and levelling energy shortage demand scheme.

In priority based scheme, the gateway leader allocates energy to those gateways that are failing to run network appliances at the same priority level. The allocation will be followed from higher priority to lower priority until the gateway leader runs out of the remaining excess energy. Once such computation is over, the gateway leader conveys the gateways to reset their GHB for the forthcoming hour as computed. For example, Every gateway G(i) has say 10 actuator associated then they should have pre assigned operational priority as 1,2,3 . . . 10 where priority decreases with increasing numeric. The gateway leader will allocate budget to a gateway which is not being able to run network appliances at priority level 4 rather than another gateway which cannot afford to run network appliance at priority level 9.

In serve starving gateway first scheme, the gateway leader sorts the gateways in decreasing order of their demand of excess energy and then meets the requirement of the gateway that tops the list, that is, the gateway with most shortage. In this way it continues down the list unless it runs out of excess energy. Once this computation is over, then the gateway leader orders all other gateways to reset their GHB for the forthcoming hour as computed.

In levelling energy shortage demand scheme, the gateway allocates energy to gateways such that all are levelled in terms of shortage and orders the gateways to reset their GHB for the forthcoming hour as levelled.

Further, the gateway leader orders the one or more servers 102 to update the re-computed GHB for the forthcoming hour for the one or more associated gateways110.

An enterprise may opt to choose any of these above excess energy distribution schemes to meet demands of gateways that reported a shortage in energy budget. An enterprise may also do hit and trial to find out which of the above three options best suits their sustainable initiative. This unique energy redistribution schemes ensures most gateways with shortage can borrow energy from peer gateways and try not to switch off network appliances connected via sensors/actuators as far as possible.

Figure 2:
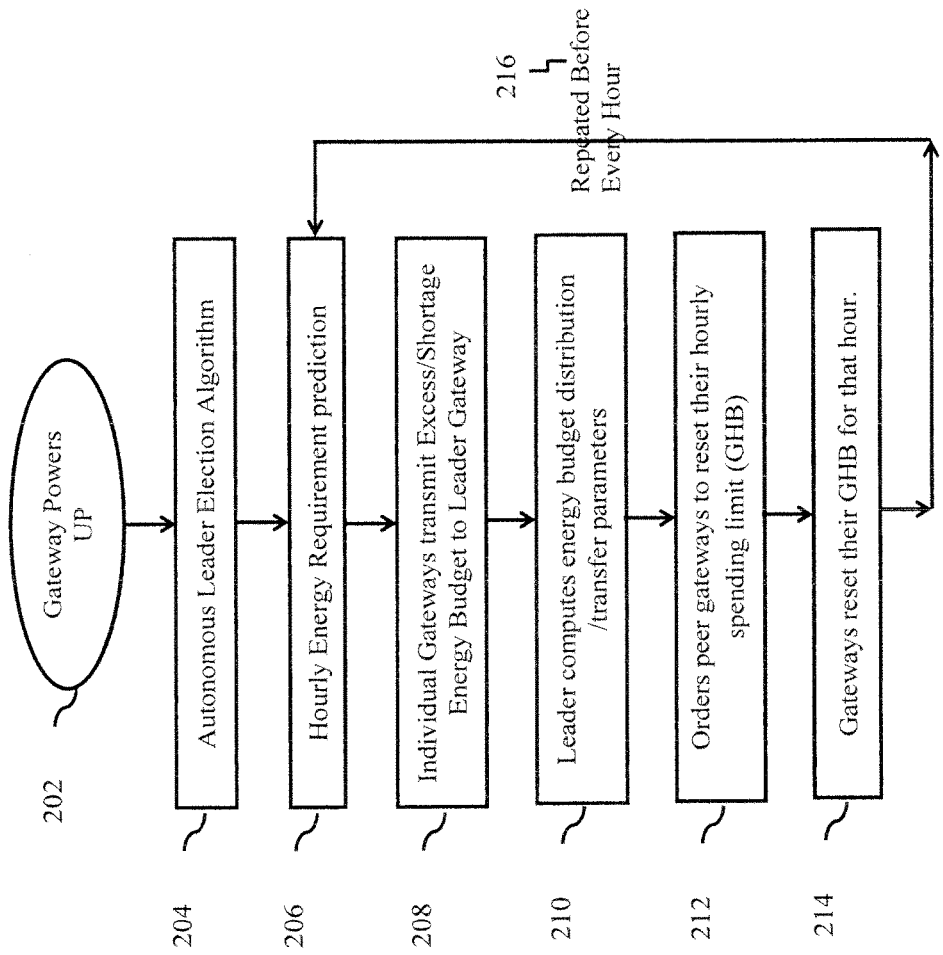
FIG. 2 is a flowchart illustrating a method for a sustainable enterprise based socially aware energy budget redistribution among one or more associated gateways, in accordance with an embodiment of the present invention.

FIG. 2 is a flowchart describing a method for sustainable enterprise based socially aware energy budget redistribution among one or more associated gateways, in accordance with an embodiment of this technology.

The process of socially aware energy budget redistribution among one or more associated gateways, involves the following steps:

At step 202, one or more gateways powers up in the enterprise network.

At step 204, a gateway leader is autonomously elected from the pool of gateways connected to the enterprise network by implementing the autonomous leader election algorithmic method.

At step 206, each gateway predicts hourly energy requirement GHB for the forthcoming hour based on dynamic constraints and by using linear regression algorithmic method. The dynamic constraints include current hourly energy budget and policy constraints for enforced ON or OFF of network appliances.

At step 208, the gateways reports to the gateway leader at the beginning of the hour regarding the shortage or excess of energy budget for the forthcoming hour.

At step 210, the gateway leader re-computes energy distribution and transfer parameters.

At step 212, Post re-computation of energy distribution and transfer parameters, the gateway leader orders the gateways to reset their hourly spending limit (GHB) for the forthcoming hour accordingly.

At step 214, the gateways exchanges energy budget as ordered and resets their GHB for the forthcoming hour.

At step 216, the redistribution of hourly energy budget method is reiterated for every hour to calculate the new GHB for the forthcoming hour, so as to enable optimal utilization of energy and providing maximum runtime to the network appliances connected to the enterprise network.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions, methods and models may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The illustrative embodiments described in the detailed description, drawings, and claims are not meant to be limiting, could take numerous forms including, but not limited to, any combination thereof. It should be understood that the exemplary zigbee gateways within the enterprise network should not be limited to zigbee gateways alone but includes other mobile gateways connected wirelessly.

The following description is presented to enable a person of ordinary skill in the art to make and use this technology and is provided in the context of the requirement for a obtaining a patent. The present description is the best presently-contemplated method for carrying out this technology. Various modifications to the preferred embodiment will be readily apparent to those skilled in the art and the generic principles of the this technology may be applied to other embodiments, and some features of this technology may be used without the corresponding use of other features. Accordingly, this technology is not intended to be limited to the embodiment shown but is to be accorded the widest scope consistent with the principles and features described herein.

What is claimed is:

1. A method for enterprise based socially aware energy budget management, comprising:

determining, by one of one or more gateway computing devices, when the one of the one or more gateway computing devices is a leader gateway computing device based on a response associated with one or more broadcast messages transmitted by the one of the one or more gateway computing devices; and when the determination indicates that the one of the one or more gateway computing devices is the leader gateway computing device:

receiving, by the one of the one or more gateway computing devices, a predicted Gateway Hourly Budget (GHB) requirement for an upcoming time period from each of the one or more gateway computing devices that are in communication with their associated one or more network appliances, wherein each of the one or more gateway computing devices is a separate computing device from the one or more network appliances;

identifying, by the one of the one or more gateway computing devices, at least one of a gateway computing device from the one or more gateway computing devices that fails to provide a first amount of energy required to run one or more sensors associated with the one or more network appliances based on the received predicted GHB requirement;

allocating, by the one of the one or more gateway computing devices, at least a portion of an energy budget to the identified at least one of the gateway computing device that fails to provide the first amount of energy required to run one or more sensors associated with the one or more network appliances;

distributing, by the one of the one or more gateway computing devices, the allocated portion of the energy budget to the identified at least one of the gateway computing device.

2. The method as set forth in claim 1, wherein the one of the one or more gateway computing devices is autonomously elected by the one or more gateway computing devices based on an autonomous leader election algorithmic model.

3. The method as set forth in claim 1, wherein the predicted GHB requirement for the upcoming time period comprises at least one of a predicted shortage Gateway Hourly Budget (GHB) or a predicted excess GHB.

4. The method as set forth in claim 1, further comprising updating, by the one of the one or more gateway computing devices, a server computing device with a recomputed GHB for the one or more gateway computing devices.

5. The method as set forth in claim 1, wherein the one of the one or more gateway computing devices allocates excess energy to the one or more gateway computing devices that are failing to run network appliances at a priority level, wherein the allocation is followed from a higher priority to a lower priority associated with the one or more gateway computing devices until the one of the one or more gateway computing devices runs out of the remaining excess energy.

6. The method as set forth in claim 1, wherein the one or more network appliances comprises one or more sensors and one or more actuators.

7. The method as set forth in claim 6, wherein the one or more actuators receives commands from the one of the one or more gateway computing devices, wherein the one or more actuators perform actions in conformance with the received commands.

8. A gateway computing device, comprising a processor and a memory coupled to the processor which is configured to be capable of executing programmed instructions comprising and stored in the memory to:

determine when the one of the one or more gateway computing devices is a leader gateway computing device based on a response associated with one or more broadcast messages transmitted by the one of the one or more gateway computing devices; and when the determination indicates that the one of the one or more gateway computing devices is the leader gateway computing device:

receive a predicted Gateway Hourly Budget (GHB) requirement for an upcoming time period from each of the one or more gateway computing devices that are in communication with their associated one or more network appliances, wherein each of the one or more gateway computing devices is a separate computing device from the one or more network appliances;

identify at least one of a gateway computing device from the one or more gateway computing devices that fails to provide a first amount of energy required to run one or more sensors associated with the one or more network appliances based on the received predicted GHB requirement;

allocate at least a portion of an energy budget to the identified at least one of the gateway computing device that fails to provide the first amount of energy required to run one or more sensors associated with the one or more network appliances; and distribute the allocated portion of the energy budget to the identified at least one of the gateway computing device.

9. The gateway computing device as set forth in claim 8, wherein the one of the one or more gateway computing devices is autonomously elected by the one or more gateway computing devices based on an autonomous leader election algorithmic model.

10. The gateway computing device as set forth in claim 8, wherein the predicted GHB requirement for the upcoming time period comprises at least one of a predicted shortage Gateway Hourly Budget (GHB) or a predicted excess GHB.

11. The gateway computing device as set forth in claim 8, wherein the processor is further configured to be capable of executing at least one additional programmed instructions comprising and stored in the memory to update a server computing device with a recomputed GHB for the one or more gateway computing devices.

12. The gateway computing device as set forth in claim 8, wherein the one of the one or more gateway computing devices allocates excess energy to the one or more gateway computing devices that are failing to run network appliances at a priority level, wherein the allocation is followed from a higher priority to a lower priority associated with the one or more gateway computing devices until the one of the one or more gateway computing devices runs out of the remaining excess energy.

13. The gateway computing device as set forth in claim 8, wherein the one or more network appliances comprises one or more sensors and one or more actuators.

14. The gateway computing device as set forth in claim 13, wherein the one or more actuators receives commands from the one of the one or more gateway computing devices, wherein the one or more actuators perform actions in conformance with the received commands.

15. A non-transitory computer readable medium having stored thereon instructions for enterprise based socially aware energy budget management comprising executable code which when executed by at least one processor, causes the processor to perform steps comprising:

determining when the one of the one or more gateway computing devices is a leader gateway computing device based on a response associated with one or more broadcast messages transmitted by the one of the one or more gateway computing devices; and when the determination indicates that the one of the one or more gateway computing devices is the leader gateway computing device:

receiving a predicted Gateway Hourly Budget (GHB) requirement for an upcoming time period from each of the one or more gateway computing devices that are in communication with their associated one or more network appliances, wherein each of the one or more gateway computing devices is a separate computing device from the one or more network appliances;

identifying at least one of a gateway computing device from the one or more gateway computing devices that fails to provide a first amount of energy required to run one or more sensors associated with the one or more network appliances based on the received predicted GHB requirement allocating at least a portion of an energy budget to the identified at least one of the gateway computing device that fails to provide the first amount of energy required to run one or more sensors associated with the one or more network appliances; and distributing the allocated portion of the energy budget to the identified at least one of the gateway computing device.

16. The non-transitory computer readable media as set forth in claim 15, wherein the steps are performed by the one of the one or more gateway computing devices and the one of the one or more gateway computing devices is autonomously elected by the one or more gateway computing devices based on an autonomous leader election algorithmic model.

17. The non-transitory computer readable media as set forth in claim 15, wherein the predicted GHB requirement for the upcoming time period comprises at least one of a predicted shortage Gateway Hourly Budget (GHB) or a predicted excess GHB.

18. The non-transitory computer readable media as set forth in claim 15, further having stored thereon instructions comprising executable code which when executed by the processor further causes the processor to perform steps further comprising updating a server computing device with a recomputed GHB for the one or more gateway computing devices.

19. The non-transitory computer readable media as set forth in claim 15, further having stored thereon instructions comprising executable code which when executed by the processor further causes the processor to perform steps further comprising allocating excess energy to the one or more gateway computing devices that are failing to run network appliances at a priority level, wherein the allocation is followed from a higher priority to a lower priority associated with the one or more gateway computing devices until the one of the one or more gateway computing devices runs out of the remaining excess energy.

20. The non-transitory computer readable media as set forth in claim 15, further comprises wherein the one or more network appliances comprises one or more sensors and one or more actuators, and wherein the one or more actuators receives commands from the one of the one or more gateway computing devices and perform actions in conformance with the received commands.

* * * * *